US007370521B1

(12) United States Patent
Sandmann et al.

(10) Patent No.: US 7,370,521 B1
(45) Date of Patent: May 13, 2008

(54) METHOD TO DETECT A CONTAMINATED FUEL INJECTOR

(75) Inventors: Nils Sandmann, Gruenstadt (DE); Noboru Takahashi, Frankfurt am Main (DE); Douglas E. Trombley, Eppstein-Bremthal (DE); Jeffrey J. Allen, Bloomfield Hills, MI (US); Dietmar Mueller, Riedstadt (DE); Thomas Wagner, Trebur (DE); Toshio Ichimasa, Zama (JP); Yoshiki Torii, Sagamihara (JP)

(73) Assignee: GM Global Technology Operations, Inc., Detroit, MI (US)

( * ) Notice: Subject to any disclaimer, the term of this patent is extended or adjusted under 35 U.S.C. 154(b) by 31 days.

(21) Appl. No.: 11/552,610

(22) Filed: Oct. 25, 2006

(51) Int. Cl.
*G01M 15/00* (2006.01)

(52) U.S. Cl. .................................................. 73/119 A

(58) Field of Classification Search .................. 73/112, 73/113, 114, 115, 116, 117.2, 117.3, 118.1, 73/119 R, 119 A
See application file for complete search history.

(56) References Cited

U.S. PATENT DOCUMENTS

| | | | | |
|---|---|---|---|---|
| 4,977,872 | A * | 12/1990 | Hartopp | 123/198 A |
| 6,705,295 | B1 * | 3/2004 | Tarroux et al. | 123/488 |
| 6,817,233 | B2 * | 11/2004 | Toiyama et al. | 73/119 A |
| 7,254,993 | B2 * | 8/2007 | Metzler et al. | 73/119 A |
| 2003/0079723 | A1 * | 5/2003 | Mollin | 123/446 |
| 2003/0213473 | A1 * | 11/2003 | Coates et al. | 123/490 |
| 2005/0034514 | A1 * | 2/2005 | Shen | 73/119 A |
| 2007/0209430 | A1 * | 9/2007 | Awano et al. | 73/119 A |

* cited by examiner

*Primary Examiner*—Eric S. McCall

(57) ABSTRACT

A method of diagnosing a fuel injector of an engine system as contaminated is provided. The method comprises: recording a first fuel injection quantity; commanding a fuel rail pressure high; recording a second fuel injection quantity while the fuel rail pressure is high; and diagnosing the fuel injector as contaminated if the first fuel injection quantity is greater than the second fuel injection quantity.

23 Claims, 5 Drawing Sheets

METHOD TO DETECT A CONTAMINATED FUEL INJECTOR

FIELD OF THE INVENTION

The present invention relates to methods and systems for diagnosing contaminated fuel injectors.

BACKGROUND OF THE INVENTION

Fuel and air injection quantities supplied to an engine are controlled to meet fuel economy requirements and emission standards. Closed loop control systems sense oxygen levels in exhaust flowing from the engine in order to control air and fuel quantities flowing into the engine. If engine components such as fuel injectors malfunction fuel and air injection quantities may not be accurate. Inaccuracies in injection quantities may increase emissions and/or decrease fuel economy.

If a fuel injector malfunctions, it is commonly due to contaminates in the fuel injector. Sediment within the fuel or fuel tank may contaminate a fuel injector. Contaminated fuel injectors can increase emissions, smoke, and/or engine noise. Conventional methods of diagnosing a contaminated fuel injector require removal of the fuel injector from the engine in order to test the fuel injector on a flow bench. Disassembly of an engine can be both time consuming and costly. Furthermore, an operator of the vehicle receives no indication of the malfunction until the vehicle has been brought to a service station.

SUMMARY OF THE INVENTION

Accordingly a method of diagnosing a fuel injector of an engine system as contaminated is provided. The method comprises, recording a first fuel injection quantity; commanding a fuel rail pressure high; recording a second fuel injection quantity while the fuel rail pressure is high; and diagnosing the fuel injector as contaminated if the first fuel injection quantity is greater than the second fuel injection quantity.

In other features, the method comprises adjusting airflow and commanding the adjusted airflow if the fuel injector is diagnosed as contaminated.

In still other features, the method comprises sending a notification signal if the fuel injector is diagnosed as contaminated.

Further areas of applicability of the present invention will become apparent from the detailed description provided hereinafter. It should be understood that the detailed description and specific examples, while indicating the preferred embodiment of the invention are intended for purposes of illustration only and are not intended to limit the scope of the invention.

BRIEF DESCRIPTION OF THE DRAWINGS

The present invention will become more fully understood from the detailed description and the accompanying drawings wherein.

DETAILED DESCRIPTION OF THE PREFERRED EMBODIMENTS

Figure 1:
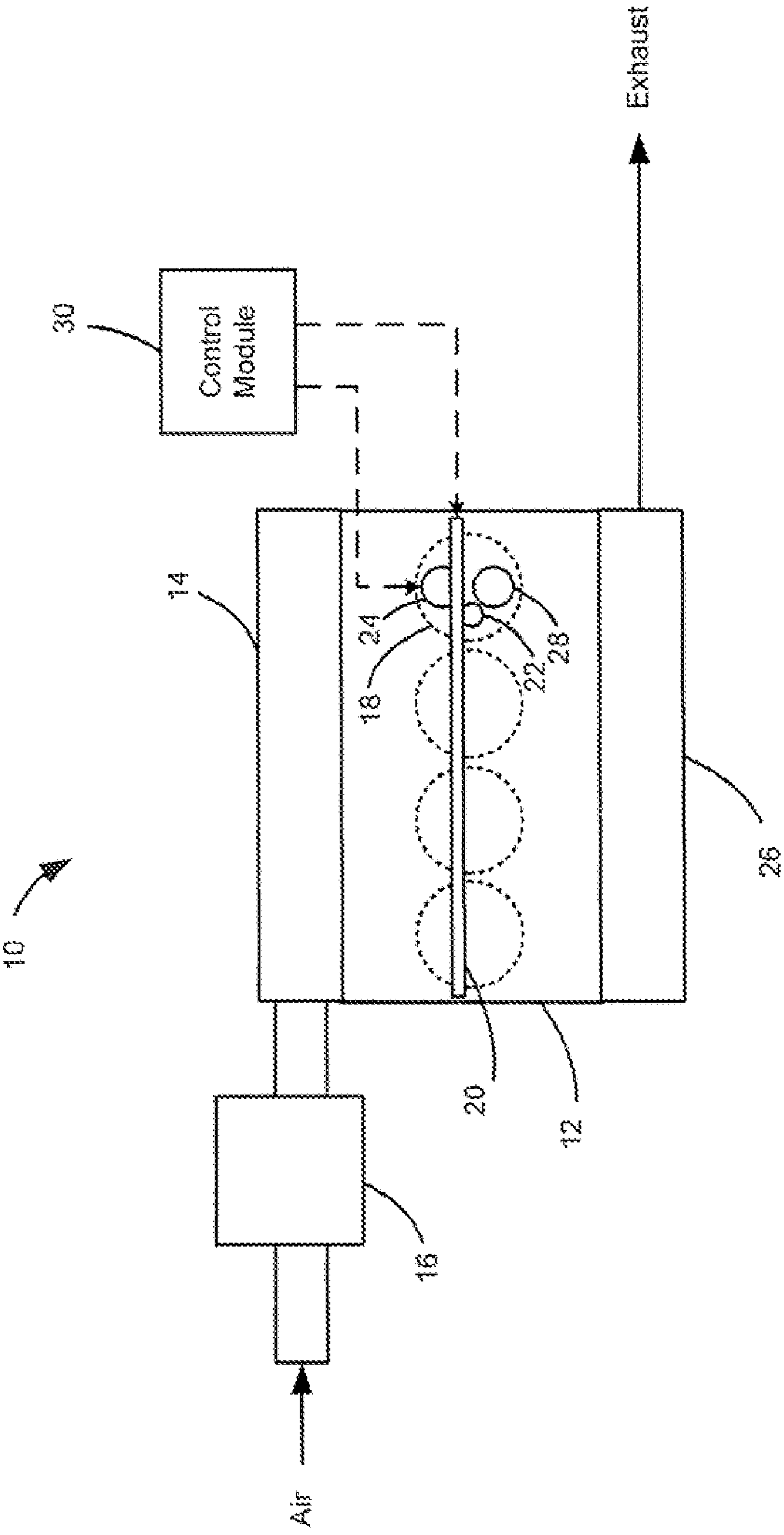
FIG. 1 is a functional block diagram of a diesel fuel injection system.

The following description of the preferred embodiment(s) is merely exemplary in nature and is in no way intended to limit the inventions its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that executes one or more software or firmware programs; a combinational logic circuit, and/or other suitable components that provide the described functionality.

Referring now to FIG. 1, an engine system 10 includes an engine 12 that combusts an air and fuel mixture to produce drive torque. Air is drawn into an intake manifold 14 through a compressor 16. Air within the intake manifold 14 is distributed into cylinders 18. Although four cylinders 18 are illustrated, it can be appreciated that the engine system can be implemented in diesel engines having a plurality of cylinders including, but not limited to, 2, 3, 5, 6, 8, 10, 12 and 16 cylinders.

Air is drawn into the cylinder 18 through an intake port. A fuel rail 20 supplies fuel to fuel injectors 22. The fuel injector 22 directly injects fuel into the cylinder 18. An intake valve 24 selectively opens and closes to enable air to enter the cylinder 18. A piston (not shown) compresses the air/fuel mixture within the cylinder 18. Heat from the compressed mixture ignites the fuel. Forces from the combustion drive the piston. The piston drives a crankshaft (not shown) to produce drive torque.

Combustion exhaust within the cylinder 18 is forced out through an exhaust manifold 26 when an exhaust valve 28 is in an open position. Exhaust is treated in an exhaust system (not shown). Although single intake and exhaust valves 24,28 are illustrated, it can be appreciated that the engine 12 can include multiple intake and exhaust valves 24,28 per cylinder 18.

A control module 30 determines and controls an air and fuel injection quantity to be supplied to each cylinder 18 based on engine operating conditions. The control module 30 diagnoses contaminated fuel injectors 22 and reports the diagnosis to an operator of the system 10. Based on the diagnosis the control module 30 adjusts a quantity of air delivered to the cylinder 18 with the contaminated injector 22 via the intake valve 24.

Figure 2:
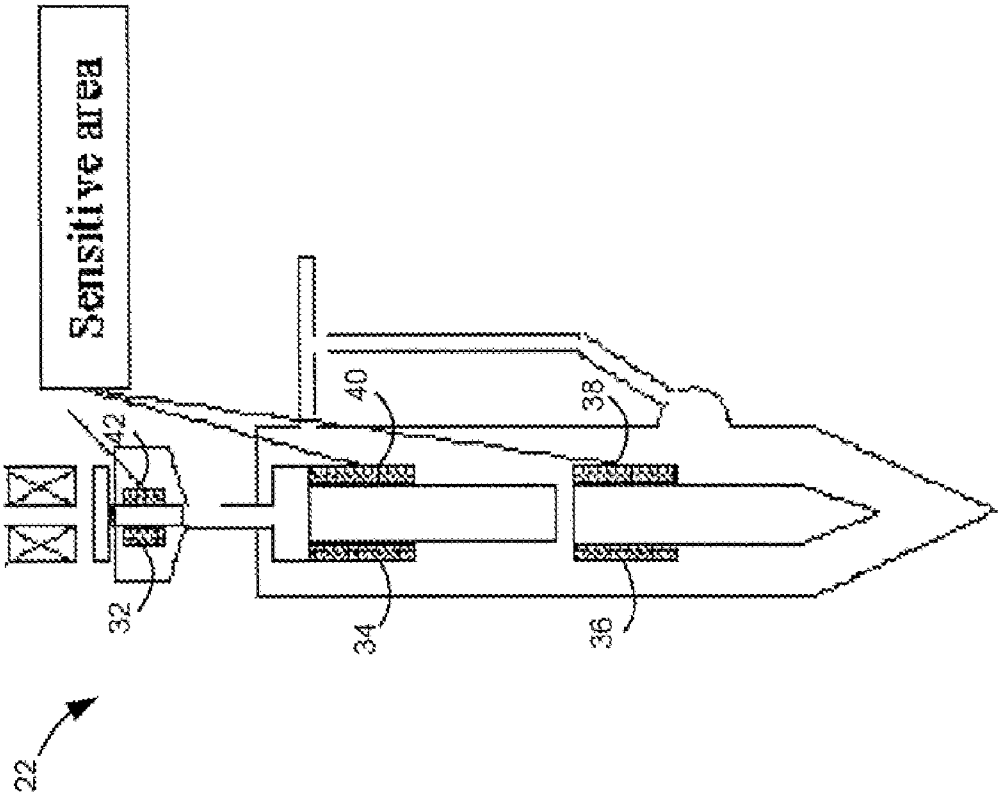
FIG. 2 is a diagram illustrating a contaminated fuel injector.
Figures 3A, 3B:
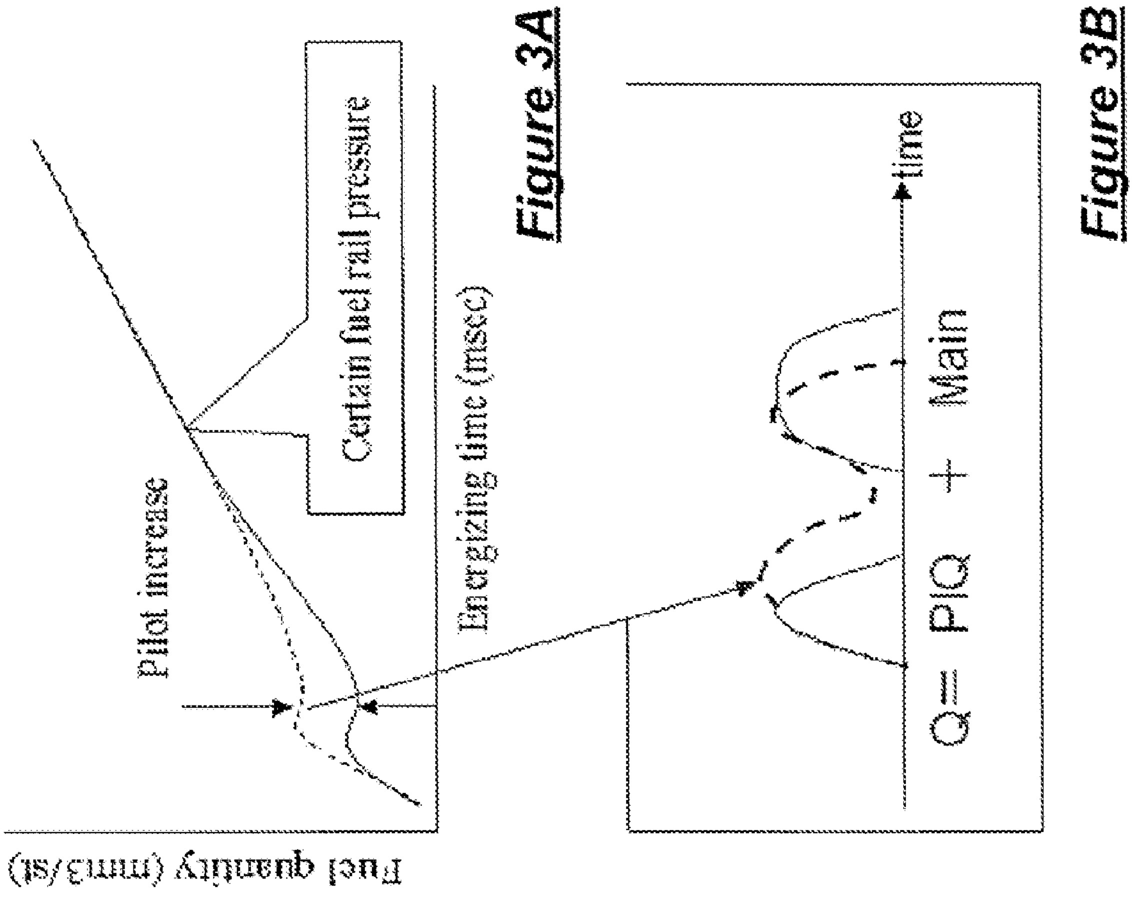
FIGS. 3A and 3B are graphs illustrating the characteristics of injection quantity.

Referring now to FIG. 2, a fuel injector is shown in more detail. When contaminated fuel is supplied to the engine 12, a chemical reaction can occur which creates fuel deposits. Deposits stick to sensitive movement areas shown at 32-42. The fuel deposits of the sensitive movement areas 32-42 increase friction thus leading to an uncontrolled injection quantity. FIGS. 5A and 3B illustrate the effects on fuel quantities for a contaminated injector. The uncontrolled fuel injection quantity will increase a pilot injection quantity (PIQ). The increase in PIQ will result in a reduction of indicated main injection (IF) quantity. A reduction in the indicated injection (IF) quantity will lead to a reduction of indicated air flow. Actual total injection quantity (Q) will not change but actual airflow will reduce.

Figure 4:
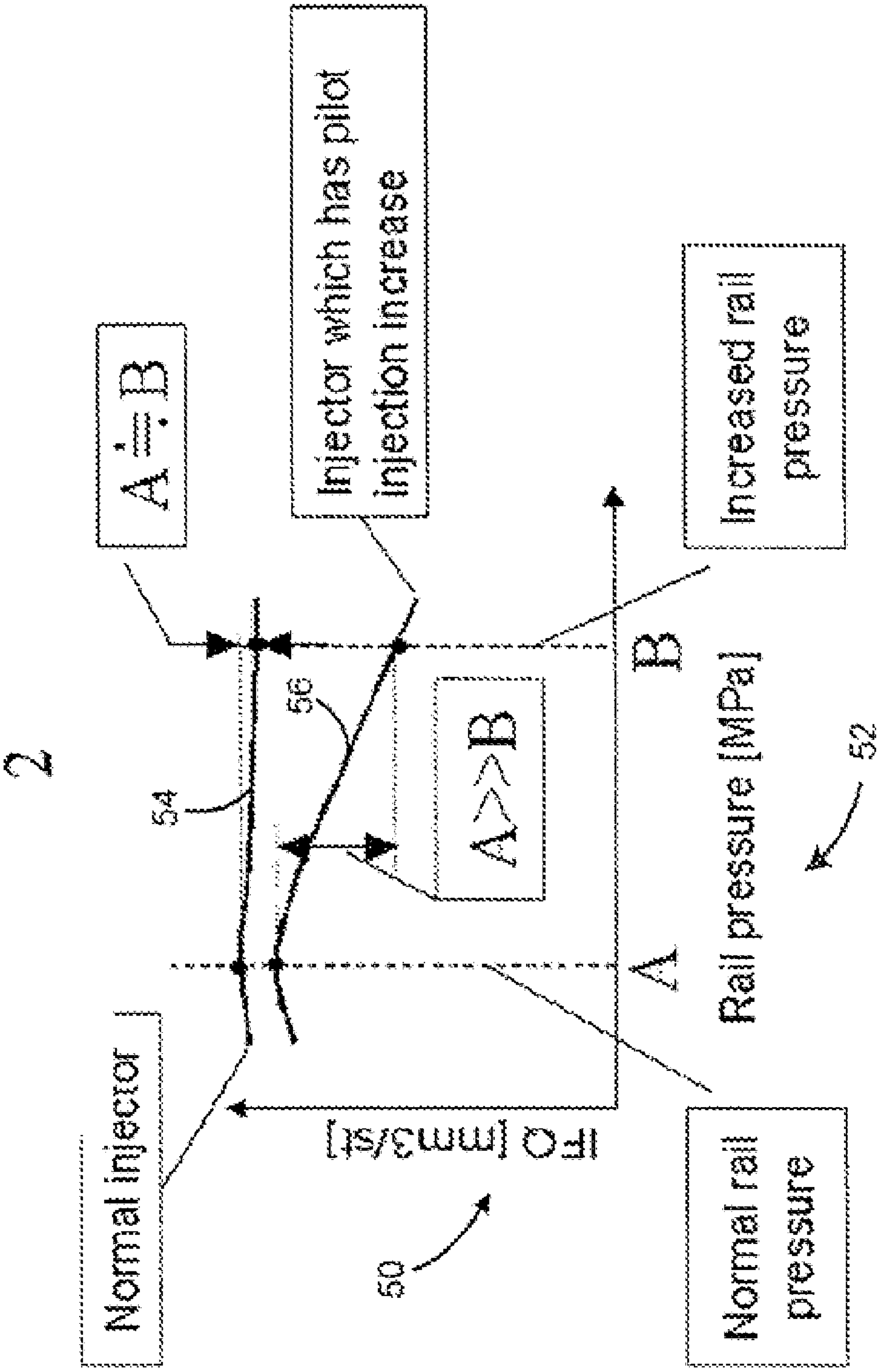
FIG. 4 is a graph illustrating an indicated fuel injection quantity when rail pressure is adjusted.

The control module 30 can diagnose a contaminated fuel injector 22 by monitoring the indicated fuel quantity when pressure to the fuel rail 20 is adjusted. FIG. 4 illustrates an IF quantity when rail pressure is adjusted. Indicated fuel injection quantity is represented along the y-axis at 50. Rail pressure is indicated along the x-axis at 52. An indicated fuel quantity for a non-contaminated fuel injector is shown at 54. An indicated fuel quantity for a contaminated fuel injector is shown at 56. Line A represents a point where fuel rail pressure is normal for engine operation. Line B represents a point where fuel rail pressure is increased for diagnosis purposes. When rail pressure is increased and indicated fuel injection quantity drops below normal, the fuel injector can be diagnosed as contaminated.

Figure 5:
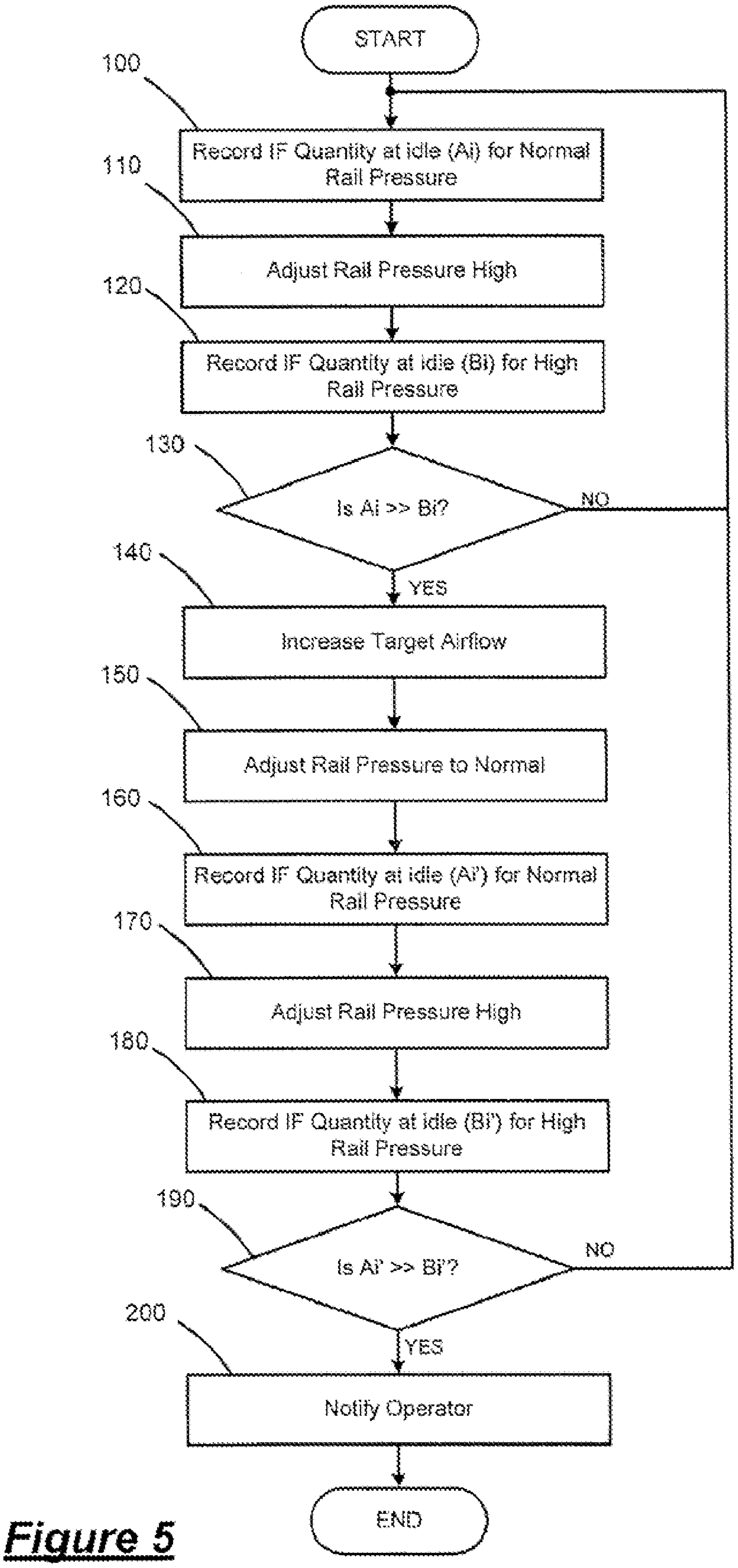
FIG. 5 is a flowchart illustrating an embodiment of the method for diagnosing a contaminated fuel injector.

FIG. 5 illustrates an embodiment of the method for diagnosing a contaminated injector. In order to diagnose an injector, the engine system must be warmed up and load from electrical devices (e.g. air conditioner, defogger, seat heater, audio system, head lamps) must not be present. Control records an indicated fuel quantity at normal fuel rail pressure at 100. Control adjusts fuel rail pressure higher at 110 and records the new indicated fuel quantity at 120. If the indicated fuel quantity at normal rail pressure is less than or equal to the indicated fuel quantity at higher rail pressure at 130, control loops back and records an indicated fuel quantity at 100.

Otherwise, if the indicated fuel quantity at normal rail pressure is greater than the indicated fuel quantity at the higher rail pressure at 130, target airflow is adjusted at 140. Control then adjusts fuel rail pressure to normal at 150 and records an indicated fuel quantity at the normal rail pressure at 160. Control adjusts fuel rail pressure higher at 170 and records the new indicated fuel quantity at 180. If the indicated fuel quantity at normal rail pressure is greater than the indicated fuel quantity at higher rail pressure at 190, control notifies the operator at 200. Otherwise control loops back to step 100.

The method illustrated in FIG. 5 requires two consecutive incidences of diagnosing the contamination before notifying an operator. As can be appreciated, other known methods for implementing diagnostic notification requirements can be incorporated into the method. For example, an X number of diagnosis must be true within Y number of samples before notification. Alternatively, an X number of diagnosis must be true within a drive cycle of a vehicle before notification.

As can be appreciated, the notification can be made by sending a signal to illuminate an indicator light of a vehicle containing the system 10, sounding a chime, or any other known means of notifying an operator. Either in addition to or alternative to notifying the operator, control can set a diagnostic code and send a wireless communication signal including the code notifying an operator located remotely from the system.

Referring back to FIG. 5, in another embodiment the method of diagnosing a contaminated fuel injector can be performed by a technician via a service tool i.e. Tech2. The technician can manipulate the service tool to request the control module to adjust rail pressure higher and report an indicated fuel quantity. If the indicated fuel quantity drops below normal, this is an indication to the service technician that the injector is contaminated and needs replacement.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A method of diagnosing a fuel injector of an engine system as contaminated, comprising:

recording a first fuel injection quantity;

commanding a fuel rail pressure high;

recording a second fuel injection quantity while the fuel rail pressure is high; and diagnosing the fuel injector as contaminated if the first fuel injection quantity is greater than the second fuel injection quantity.

2. The method of claim 1 further comprising adjusting airflow and commanding the adjusted airflow if the fuel injector is diagnosed as contaminated.

3. The method of claim 1 further comprising:

consecutively repeating the method of claim 1 a selectable number of times; and setting a diagnostic code to true if each time of the selectable number of times the fuel injector is diagnosed as contaminated.

4. The method of claim 1 further comprising sending a notification signal if the fuel injector is diagnosed as contaminated.

5. The method of claim 4 wherein said sending a notification signal comprises sending a signal to illuminate an indicator light of a vehicle.

6. The method of claim 4 wherein said sending a notification signal comprises sending a signal to sound a notification chime of a vehicle.

7. The method of claim 4 further comprising:

setting a diagnostic code to true when the fuel injector is contaminated; and wherein said sending a notification signal comprises sending a wireless communication signal indicating the diagnostic code to a remote operator.

8. The method of claim 1 further comprising repeating the method of claim 1 for a selectable number of samples and wherein if said fuel injector is diagnosed as contaminated for a selected number of incidences within said selected number of samples, a diagnostic code is set to true.

9. The method of claim 1 wherein said method is performed by a controller while a vehicle is operating and after the engine system is warm.

10. The method of claim 9 wherein said method is performed if no electrical load exists.

11. The method of claim 1 wherein said method is performed by a technician via a service tool.

12. A system for diagnosing a contaminated fuel injector of an engine system, comprising:

a first storage device that stores a first recorded injection quantity when pressure of fuel in a fuel rail is normal;

a second storage device that stores a second recorded injection quantity when pressure of fuel in said fuel rail is high; and a processor that commands pressure to the fuel rail and diagnoses the fuel injector as contaminated if said first recorded injection quantity is greater than said second recorded injection quantity.

13. The system of claim 12 wherein said processor sets a diagnostic code to true if the fuel injector is diagnosed as contaminated.

14. The system of claim 12 wherein said processor compares said first recorded injection quantity and said second recorded injection quantity a selectable number of samples and if said first recorded injection quantity is greater than said second recorded injection quantity a selectable number of incidences within said selectable number of samples, a diagnostic code is set to true.

15. The system of claim 12 wherein said processor compares said first recorded injection quantity and said second recorded injection quantity a selectable number of times, and if said first recorded injection quantity is greater than said second recorded injection quantity each time of said selectable number of times, a diagnostic code is set to true.

16. The system of claim 13 wherein said processor sends a notification message indicating that the fuel injector is contaminated.

17. The method of claim 16 wherein said processor sends a notification message to illuminate an indicator light of a vehicle.

18. The method of claim 16 wherein said processor sends a notification message to sound a chime in a vehicle.

19. The method of claim 16 wherein said processor sends a wireless communication signal to a remote operator.

20. The method of claim 12 wherein said processor and said first and second storage devices are contained within a service tool.

21. The method of claim 12 wherein said processor and said first and said second storage devices are contained within a controller.

22. The method of claim 12 wherein said processor diagnoses the fuel injector if the engine system is warm.

23. The method of claim 21 wherein said processor diagnoses the fuel injector if load from electrical loads is not present.

* * * * *